Patented Dec. 15, 1942

2,304,947

UNITED STATES PATENT OFFICE 2,304,947

METHOD OF IMPROVING THE BRILLIANCE AND COLOR OF TITANIUM DIOXIDE

Reginald Hill Monk, Montreal, Quebec, Canada, assignor to American Zinc, Lead & Smelting Company, St. Louis, Mo., a corporation of Maine No Drawing. Application December 4, 1939, Serial No. 307,547

8 Claims. (Cl. 106—300)

This invention relates to a method of improving the color and brightness of titanium dioxide, wherein colored impurities commonly occurring in titanium dioxide are caused to react with certain complex reagents such as are herein described. By this process the colored impurities are converted to colorless forms. This result is reached through a sequence of reactions made possible by the use of one of these complex reagents. A series of compounds is formed between the added components, the colored impurity and a portion of the titanium dioxide to form a very stable mixture of isomorphous crystalline forms which are dispersed in a complex crystal lattice.

I have found that a notable improvement in the brilliance and whiteness of titanium dioxide upon calcination is brought about by treating hydrated $TiO_2$, which has been washed free of soluble salts, with small quantities of certain complex substances as hereinafter described.

It is well known that insoluble compounds tend to collect at boundary surfaces. In the case of titanium dioxide containing traces of iron oxide, the tendency of the latter to become concentrated on the surface of the titanium dioxide is shown by the further oxidation which often takes place when the pigment is exposed to the air. I have found that traces of such elements as iron, which can easily occur in the manufacture of $TiO_2$, are readily deprived of deleterious effects on the pigment by introducing a small proportion of certain mixed oxides or substances readily convertible to the oxides upon calcination. Various single agents have been utilized heretofore but I have discovered that superior results are obtained by adding, prior to calcination, mixtures of two or more components, that is, mixtures of certain tri- or tetra-valent elements such as those from the spinels, with a stoichiometric excess of the oxides of certain divalent elements over that quantity required to combine with the oxides of the afore-mentioned tri- or tetra-valent elements. Although the compounds formed by the impurity in the process of calcination may themselves be colored, if the impurity is present in small amount and is mingled with the isomorphous but colorless spinels, a brilliant white $TiO_2$ is produced.

Some typical spinels are $MgAl_2O_4$, $FeAl_2O_4$, $ZnAl_2O_4$, $NiAl_2O_4$, etc. Besides these normal spinels which are aluminates, there are compounds isomorphous with their analogs with aluminium, of the so-called "equipoint" structure such as $FeMgFeO_4$, $FeTiFeO_4$, $MgTiMgO_4$, $ZnSnZnO_4$, $GaMgGaO_4$, $InMgInO_4$ etc. In the equipoint structure, considering $FeMgFeO_4$ for example, it is evident that the formula might still be written as $MR_2O_4$, where M represents a divalent metal atom, R a trivalent atom and O the divalent oxygen atom. In the unit cell for the spinel crystal, however, the distribution of the atoms of the eight spinel molecules in the equipoint structure is different from that occurring in the normal structure, there being eight of the sixteen like R atoms in the places normally occupied by the M atoms while the remaining eight R atoms together with the eight M atoms occupy the places normally occupied by the sixteen R atoms. The occurrence of a structure of this type is ideal for producing an enforced isomorphism of the impurity in a desirable crystal form. For example, consider one of the less obvious cases where $ZnSnZnO_4$ is applied to improving the color of a $TiO_2$ containing the common impurity iron. In the absence of the added substances the most likely compound to be formed would be iron titanate, $FeTiO_3$, a compound crystallizing in a different form and with a unit cell only half as large as that of the spinel and therefore less likely to obscure coloration due to the presence of the iron. But in the presence of these added oxides, the equipoint spinels $FeTiFeO_4$, $ZnSnZnO_4$ and, from an excess of the divalent ZnO, $ZnTiZnO_4$ are formed on calcination and become mutually dispersed in one another. In this manner the colored impurity becomes uniformly dispersed both towards and away from what was formerly the surface of the titanium dioxide crystal. The dispersion of the colored impurity in these white and opaque lattices results in an attenuation of the undesirable color and produces a white and brilliant $TiO_2$.

The silicates show analogous behavior. Beryl forms a compound $Al_2BeO_4$ of closely related structure to the spinels and crystallographically isomorphous with this is the olivine $Mg_2SiO_4$. Somewhat similar compounds are phenacite $Be_2SiO_4$, willemite $Zn_2SiO_4$ and nickel orthosilicate $Ni_2SiO_4$. Further the interchangeability of elements in this type of structure, analogous to the interchangeability of elements in the spinel structure, is shown by the existence of minerals such as monticellite $CaMgSiO_4$, and olivines of the type $(Fe, Mg)_2SiO_4$, in which the ratio Fe:Mg may be as low as 1:9. In this way the effect of the colored component is obscured by the preponderance of the colorless component.

Not only is this interchangeability characteristic of the type $R_2MX_4$ but the above-mentioned tendency of the spinels to form compounds rich in alumina is paralleled by the tendency of alumina to form with silica and lime, compounds rich in alumina. For example, alumina forms compounds $3CaO.Al_2O_3$, $5CaO.Al_2O_3$ and they all take into solid solution $Fe_2O_3$ up to 2.5%. Corresponding compounds to the calcium aluminates are compounds of alumina and silica such as $SiO_2.Al_2O_3$ which exists in the forms of sillimanite, alusite and cyanite and $3Al_2O_3.SiO_2$, mullite. Moreover, there are compounds of the garnet structure of the type $Ca_3Al_2Si_3O_{12}$, in which iron, chromium, or manganese may replace either the calcium or the aluminium. Finally, in the garnet structure also, magnesium is interchangeable with the calcium.

The above conclusions regarding the interchangeability of positions in crystal lattice structure of these types are amply confirmed by X-ray analyses of the intensities of the diffraction patterns derived from compounds of these types. In other words, the liability of the occurrence of molecules of colored oxides in the crystal surfaces is greatly minimized as these can occupy places distributed at random throughout the crystal cell of the complex structure.

Moreover, when considering the possible reactions occurring in a mixture of solids and the degree of completeness of such reactions, it is to be noted that combination takes place over a very considerable range of temperature and at temperatures below the melting points of some of them. This is the natural result of the lowering of the melting point characteristic of solutions in general. In the case of solids, however, the reactions proceed very slowly and though some combination occurs readily, the reactions tend to cease owing to the separation of the reactants due to the formation of thin interfacial layers through which diffusion of the reactants becomes difficult, and this is the basic principle underlying the application of mixed solids to the problem of rendering invisible traces of colored impurities in titanium dioxide. I have found it important to use substances which have potential mutual reactivity but that it is not necessary to carry the reaction to completion. Thus the addition of a mixture of oxides containing a stoichiometric excess of the oxides of divalent elements to titanium dioxide leads to the important result that two types of isomorphous crystal lattices are formed, one on each side of the original surface of the titanium dioxide crystal, consisting of equipoint structure spinels, the one between the two added oxides and the other between the reactive oxide and the titanium dioxide. The colored impurity existing on the original surface of the titanium dioxide being soluble in both spinel types is thus dispersed to such an extent that it becomes invisible to the eye as a departure from pure white or as a loss of brilliance. Consequently the total effect of the addition of mixtures of oxides of the types described herein consists in the formation of solid products wherein the potentially colored molecules are mingled with potentially colorless molecules, by which means the extinction of color effects is greatly facilitated during the calcination of the pigment.

For the more reactive component of the mixture from which the two types of spinels are obtained, the oxides BeO, MgO, CaO, SrO, BaO and ZnO are especially suitable. These oxides are of divalent metals, are white and when prepared by precipitation of the hydroxide at room temperatures, show crystallinity of structure even when in a high degree of dispersion. The oxides of the tri- or tetra-valent elements providing the less reactive component for the highly dispersed spinel layer upon the outside of the $TiO_2$, which are most satisfactory are those such as $Al_2O_3$, $SiO_2$ and $SnO_2$. These oxides differ from those used for the other component in that their hydrous forms are gelatinous, show little or no trace of crystallinity but, upon ignition, tend to develop a highly polymerized layer or chain structure. While a simple combination of one component with a stoichiometric excess of one of the other components forms a suitable complex for carrying out the purposes of this invention, it is to be understood that a plurality of the divalent elements, with or without a plurality of the tri- or tetra-valent elements are combinations within the spirit of the invention. For example, a dolomitic lime composed of CaO and MgO in naturally occurring proportions may be used in combination with a mixture of alumina and silica.

The substances occurring in titanium dioxide as impurities and removable by this method, comprise the oxides of iron, nickel, cobalt, chromium, manganese and vanadium. All of these oxides occur naturally in the form MX where M represents the metallic element and X oxygen as required by a normal spinel. Where they occur in higher states of combination with oxygen, they can, by means of the "equipoint" or an analogous structural substitution, take up positions in an equivalent crystal lattice.

The following examples illustrate this invention but they are not to be taken as limiting the scope of the disclosure:

*Example No. 1.*—162 grams of zinc oxide are made into a slurry with 500 cc. of water and to it is added, very slowly, a mixture of 41 grams of sulphuric acid (sp. g. 1.84) and 400 cc. of water, with constant stirring. After this mixture has been allowed to stand for a few hours, there is added to it a dilute solution of 114 grams of silicate of soda ($Na_2SiO_3.9H_2O$). The solid matter consisting of approximately 124 grams zinc oxide and 56 grams zinc silicate (dry weight) is then washed free of soluble salts, and is added to a slurry of eleven thousand grams (dry weight) of freshly precipitated $TiO_2$. After thoroughly mixing, the mass is calcined to approximately 840° C.

*Example No. 2.*—To 171 grams of sodium hydroxide dissolved in a 5% solution, are added 268 grams of aluminium sulphate $(Al_2SO_4)_3.9H_2O$. To this solution is then added 160 grams of sodium hydroxide and 407 grams of zinc sulphate mixed together beforehand. This produces a precipitate of zinc hydroxide (approximately 198 grams) and zinc aluminate (approximately 97 grams both dry weight) which is thoroughly washed, added to 6,500 grams (dry weight) of titanium dioxide in a slurry and after thoroughly mixing is calcined to approximately 875° C.

*Example No. 3.*—A mixture of 9 mols of magnesium chloride and 1 mol of stannic chloride is precipitated with a solution of ammonium bicarbonate to produce a mixture of a stannic acid and magnesium carbonate. After the precipitate is thoroughly washed, 4 parts by dry weight of the solids are added to 96 parts (dry weight) of a slurry of washed and neutralized titanium dioxide. After thoroughly mixing, the product is calcined to approximately 840° C.

The above examples are designed to serve as a guide to the operator and it is to be understood that the scope of the invention is not in any way limited by them, reference being had to the appended claims for this purpose. Thus in the above examples the amount of concentrates of the mixed oxides varies from 1.67+% to 4.54+% of the $TiO_2$ treated. As a matter of practice concentrations of the mixed oxides greater than 5% of the $TiO_2$ treated are not advisable, but any ratio of the oxide of the divalent element to the oxide of the tri- or tetravalent element is within the scope of the invention provided that always the oxide of the divalent element is present in stoichiometric excess with respect to the tri- or tetra-valent oxide. The smaller the amount of impurity present, the less the amount of the two kinds of substance required. Preliminary tests will readily enable one skilled in the art to determine the amount of such substances to use to overcome the impurities present in the particular $TiO_2$ to be treated.

It is to be understood that the term "oxide" as herein used is intended to cover such substances as the hydrates of the oxides and such other substances as the carbonates that are readily convertible to the oxides on calcination.

What is claimed is:

1. The process which consists in mixing at least one oxide of that group of elements consisting of aluminum, gallium, indium, silicon, germanium and tin with at least one oxide of that group of metals consisting of beryllium, magnesium, calcium, strontium, barium and zinc, the oxide or oxides in said mixture taken from the latter group being in stoichiometric excess of the oxide or oxides in the mixture taken the first mentioned group, said excess being calculated upon the normal spinel compounds of equal combining weights of all the said oxides in the mixture, adding the said mixture to uncalcined $TiO_2$ containing colored impurities in an amount equal to not more than 5% of the $TiO_2$ and then calcining the same.

2. The process which consists in adding to a titanium dioxide containing colored impurities, substantially free from soluble salts, at least one oxide from that group of metals consisting of aluminum, gallium, indium, silicon, germanium and tin and at least one of the oxides from that group of metals consisting of beryllium magnesium, calcium, strontium, barium and zinc, the oxide or oxides from the last named group being in stoichiometric excess over the oxide or oxides of the first named group, said excess being calculated upon the normal spinel compounds of equal combining weights of all the said oxides in the mixture, said mixture being added to the titanium dioxide in an amount equivalent to up to 5% thereof and then calcining the mixture.

3. A pigment consisting of a calcined mixture of $TiO_2$ which normally contains colored impurities with at least one of the oxides of that group of metals consisting of aluminum, gallium, indium, silicon, germanium and tin and a stoichiometric excess of at least one of the oxides of that group of metals consisting of beryllium, magnesium, calcium, strontium, barium and zinc, said mixture of oxides being used in an amount up to 5% of the $TiO_2$, whereby said colored impurities are obscured.

4. The process which consists in adding MgO and at least one of the oxides of that group of metals consisting of aluminum, gallium, indium, silicon, germanium and tin to titanium dioxide containing colored impurities, the MgO being in stoichiometric excess of the oxides selected from said group, said excess being calculated upon normal spinel compounds of equal combining weights of the oxides added, and the amount of said added oxides being not more than about 5% of the titanium dioxide, and then calcining the mixture of oxides and titanium dioxide.

5. The process which consists in adding MgO and $Al_2O_3$ to titanium dioxide containing colored impurities, the MgO being in stoichiometric excess of the quantity required to form the normal spinel $MgAl_2O_4$ and the amount of MgO and $Al_2O_3$ being not more than about 5% of the titanium dioxide, and then calcining the mixture.

6. The process which consists in adding ZnO and at least one of the oxides of that group of metals consisting of aluminum, gallium, indium, silicon, germanium and tin to titanium dioxide containing colored impurities, the ZnO being in stoichiometric excess of the oxides selected from said group, said excess being calculated upon normal spinel compounds of equal combining weights of the oxides added, and the amount of said added oxides being not more than about 5% of the titanium dioxide, and then calcining the mixture of oxides and titanium dioxide.

7. The process which consists in adding ZnO and $SiO_2$ to titanium dioxide containing colored impurities, the ZnO being in stoichiometric excess of the quantity required to form the normal spinel $ZnSi_2O_3$ and the amount of ZnO and $SiO_2$ being not more than about 5% of the titanium dioxide, and then calcining the mixture.

8. The process which consists in adding a mixture of ZnO and MgO and at least one of the oxides of that group of metals consisting of aluminum, gallium, indium, silicon, germanium and tin to titanium dioxide containing colored impurities, the amount of ZnO and MgO being in stoichiometric excess of the oxides selected from said group, said excess being calculated upon normal spinel compounds of equal combining weights of the oxides added, and the amount of said added oxides being not more than about 5% of the titanium dioxide, and then calcining the miture of said added oxides and titanium dioxide.

REGINALD HILL MONK.